US009958995B2

United States Patent
Jin

(10) Patent No.: US 9,958,995 B2
(45) Date of Patent: May 1, 2018

(54) TOUCH DISPLAY PANEL INCLUDING SECOND LEAD BETWEEN ELECTRODE UNIT AND COMMON LEAD AND METHOD FOR DRIVING THE SAME

(71) Applicants: Shanghai AVIC OPTO Electronics Co., Ltd, Shanghai (CN); TIANMA MICRO-ELECTRONICS CO., LTD, Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 43 days.

(21) Appl. No.: 14/994,918

(22) Filed: Jan. 13, 2016

(65) Prior Publication Data
US 2016/0291711 A1 Oct. 6, 2016

(30) Foreign Application Priority Data
Apr. 1, 2015 (CN) .......................... 2015 1 0152937

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC ........ G06F 3/044; G06F 3/0416; G09G 3/006
See application file for complete search history.

(56) References Cited

U.S. PATENT DOCUMENTS

2013/0328757 A1 12/2013 Matsumoto et al.
2014/0132534 A1 5/2014 Kim
(Continued)

FOREIGN PATENT DOCUMENTS

CN 101017419 A 8/2007
CN 103150069 A 6/2013
(Continued)

OTHER PUBLICATIONS

1st Office Action as issued in corresponding Chinese Application No. 201510152937.5, dated Jun. 15, 2016.

*Primary Examiner* — Kwang-Su Yang
(74) *Attorney, Agent, or Firm* — Alston & Bird LLP

(57) ABSTRACT

A touch display panel and a method for driving the same are provided. The touch display panel includes a first substrate; a plurality of electrode units, a plurality of switches, a touch display circuit and a common lead disposed on the first substrate, wherein the common lead is adapted for transmitting a common signal, each electrode unit is connected with the touch display circuit through one of a plurality of first leads, each of the plurality of electrode units is connected with the common lead through one of a plurality of second leads, and each of the plurality of switches is disposed between one of the plurality of second leads and the common lead, so as to disconnect the common lead and the plurality of second leads during a touch sensing period, and connect the common lead and the plurality of second leads during a display period.

15 Claims, 3 Drawing Sheets

(56) References Cited

U.S. PATENT DOCUMENTS

| | | | |
|---|---|---|---|
| 2015/0116263 A1* | 4/2015 | Kim | G06F 3/044 345/174 |
| 2015/0185941 A1* | 7/2015 | Lee | G06F 3/0412 345/173 |
| 2015/0205428 A1* | 7/2015 | Wang | G06F 3/044 345/174 |
| 2015/0220174 A1 | 8/2015 | Mu et al. | |
| 2016/0062502 A1* | 3/2016 | Liu | G06F 3/044 345/174 |
| 2016/0155859 A1* | 6/2016 | Kimura | G09G 3/3648 257/43 |
| 2017/0031507 A1* | 2/2017 | Huang | G06F 3/044 |

FOREIGN PATENT DOCUMENTS

| | | |
|---|---|---|
| CN | 103487967 A | 1/2014 |
| CN | 103809316 A | 5/2014 |
| CN | 104426359 A | 3/2015 |

\* cited by examiner

TOUCH DISPLAY PANEL INCLUDING SECOND LEAD BETWEEN ELECTRODE UNIT AND COMMON LEAD AND METHOD FOR DRIVING THE SAME

CROSS-REFERENCE TO RELATED APPLICATIONS

The present application claims priority to Chinese patent application No. 201510152937.5, filed on Apr. 1, 2015, and entitled "TOUCH DISPLAY PANEL AND METHOD FOR DRIVING THE SAME", the content of which are hereby incorporated by reference in their entirety.

BACKGROUND

Nowadays, touch panels are most simple, convenient and natural input mediums for human-computer interaction. More and more flat panel display manufacturers research integrating touch functionality in Liquid Crystal Displays (LCD) and/or Organic Light-Emitting Diode (OLED) displays.

In order to reduce the size of touch panels and the size of mobile terminals the touch panels are configured thereon, in-cell Touch Panel (TP) technology was recently relied on in display technologies. In the in-cell TP technology, touch electrodes can be integrated in a liquid crystal cell. Therefore, touch panels using the in-cell TP technology have a smaller size than touch panels using an One Glass Solution (OGS).

In order to integrate a touch function on an LCD, a conventional method divides common electrodes on the LCD into a plurality of independent touch electrode units. In such in-cell TP, each touch electrode unit is connected with a touch display circuit only through a touch electrode lead. In order to increase an aperture ratio of a pixel unit, the touch electrode lead is usually disposed under a black matrix between adjacent pixel units. The black matrix has a small width, which results a small width and a high resistance of the touch electrode lead. Especially, the touch electrode unit far away from the touch display circuit may have a higher resistance because of a larger length. During the display period, the touch electrode lead having a large resistance may result an excessive delay of a common signal applied to the touch electrode unit. When other leads are coupled with the touch electrode unit, a time for restoring the touch electrode unit to a common potential is increased, which may result in problems, such as flicker, uneven display of black screen, residual image, etc.

SUMMARY

The present disclosure generally relates to display technology, and more particularly, to provide a touch display panel and a method for driving the same, so as to reduce delay of common potential on a touch electrode unit.

In order to solve the above problems, a touch display panel is provided in embodiments of the present disclosure. The touch display panel may include: a first substrate; an electrode array disposed on the first substrate, wherein the electrode array comprises a plurality of electrode units arranged in an array structure, and wherein the plurality of electrode units serve as touch sensing electrodes during a touch sensing period, and serve as common electrodes during a display period; a touch display circuit adapted for applying a touch signal to the plurality of electrode units during the touch sensing period, and applying a common signal to the plurality of electrode units during the display period; a plurality of first leads adapted for transmitting the touch signal, wherein each of the plurality of electrode units is electrically connected with the touch display circuit through one of the plurality of first leads; a common lead which is electrically connected with the touch display circuit and adapted for transmitting the common signal; a plurality of second leads, wherein each of the plurality of electrode units is electrically connected with the common lead through one of the plurality of second leads; and a plurality of switches, wherein each of the plurality of switches is disposed between one of the plurality of second leads and the common lead.

A method for driving the above touch display panel is also provided in embodiments of the present disclosure. The method may include: step S1, turning on the plurality of switches, and applying a common signal to the plurality of electrode units through both the plurality of first leads and the plurality of second leads; and step S2, turning off the plurality of switches, and applying a touch signal to the plurality of electrode units through the plurality of first leads.

DETAILED DESCRIPTION

As described above, the touch electrode lead of the conventional in-cell TP has a high resistance. In particular, the touch electrode unit far away from the touch display circuit may have a higher resistance because of an associated greater length. During the display period, the touch electrode lead having a large resistance may result an excessive delay of a common signal applied to the touch electrode unit. When other leads are coupled with the touch electrode unit, a time for restoring the touch electrode unit to a common potential is increased, which may result in problems, such as flicker, uneven display of black screen, residual image, etc.

In order to solve the above problems, a touch display panel is provided in embodiments of the present disclosure. The touch display panel may include: a first substrate; an electrode array disposed on the first substrate, wherein the electrode array includes a plurality of electrode units which are arranged in an array structure, and wherein the plurality of electrode units serve as touch sensing electrodes during a touch sensing period, and serve as common electrodes during a display period; a touch display circuit adapted for applying a touch signal to the plurality of electrode units during the touch sensing period, and applying a common signal to the plurality of electrode units during the display period; a plurality of first leads adapted for transmitting the touch signal, wherein each of the plurality of electrode units is electrically connected with the touch display circuit through one of the plurality of first leads; a common lead which is electrically connected with the touch display circuit and adapted for transmitting the common signal; a plurality of second leads, wherein each of the plurality of electrode units is electrically connected with the common lead through one of the plurality of second leads; and a plurality of switches, wherein each of the plurality of switches is disposed between one of the plurality of second leads and the common lead.

During the display period, the plurality of switches are turned on to connect the common lead and the plurality of second leads. Therefore, during the display period, each electrode unit can obtain the common signal through both the first lead and the second lead which are electrically connected in parallel, so that an equivalent resistance between the electrode unit and the touch display circuit can be reduced, a common signal delay of the electrode unit can be reduced, and a probability of occurrence of flicker, uneven display of black screen, or residual image can be reduced.

In order to clarify the objects, characteristics and advantages of the disclosure, the embodiments of the present disclosure will be described in detail in conjunction with the accompanying drawings.

Figure 1:
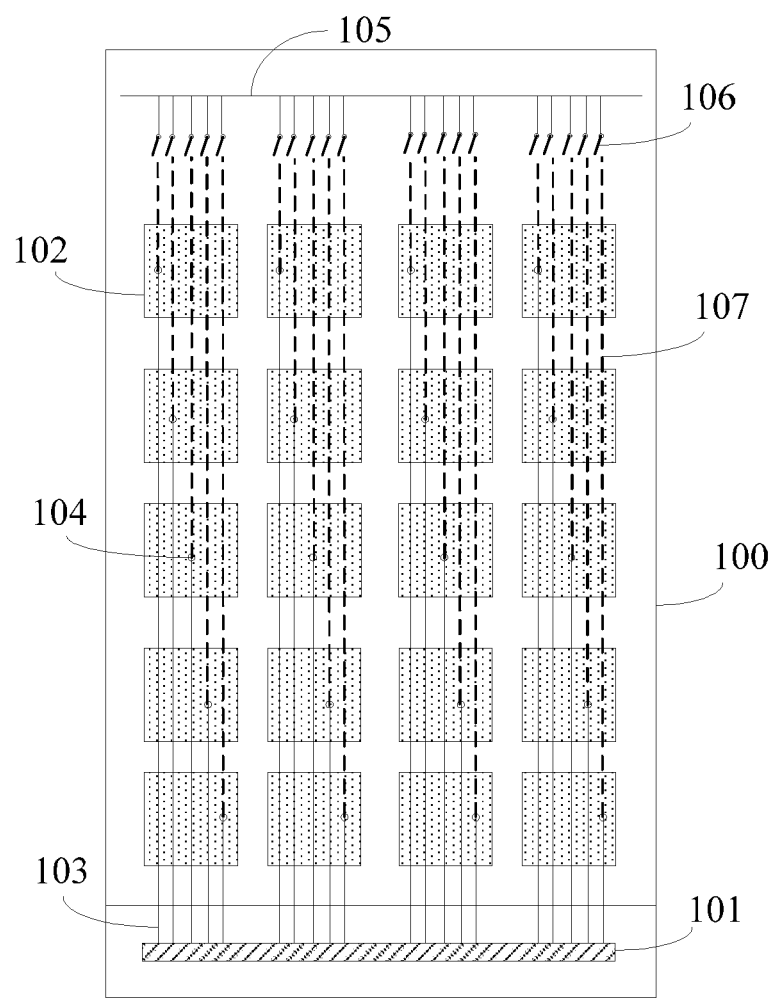
FIG. 1 schematically illustrates a diagram of a touch display panel according to an embodiment of the present disclosure.

As shown in FIG. 1, a touch display panel is illustrated according to one embodiments of the present disclosure. The touch display panel will be described in detail in conjunction with FIG. 1. Referring the FIG. 1, the touch display panel includes: a first substrate 100; an electrode array disposed on the first substrate 100, wherein the electrode array includes a plurality of electrode units 102 which are arranged in an array structure, and wherein the plurality of electrode units 102 serve as touch sensing electrodes during a touch sensing period, and serve as common electrodes during a display period; a touch display circuit 101 adapted for applying a touch signal to the plurality of electrode units 102 during the touch sensing period, and applying a common signal to the plurality of electrode units 102 during the display period; a plurality of first leads 103 adapted for transmitting the touch signal, wherein each of the plurality of electrode units 102 is electrically connected with the touch display circuit 101 through one of the plurality of first leads 103; a common lead 105 which is electrically connected with the touch display circuit 101 and adapted for loading the common signal; a plurality of second leads 107, wherein each of the plurality of electrode units 102 is electrically connected with the common lead 105 through one of the plurality of second leads 107; and a plurality of switch devices 106, wherein each of the plurality of switches 106 is disposed between one of the plurality of second leads 107 and the common lead 105, so as to electrically disconnect the common lead 105 and the plurality of second leads 107 during the touch sensing period, and electrically connect the common lead 105 and the plurality of second leads 107 during the display period.

It should be noted that, in this embodiment, the touch display panel further includes a second substrate (not shown in FIG. 1) disposed oppositely to the first substrate 100.

The first substrate 100 is an array substrate, and the second substrate is a color filter. The touch display panel further includes a liquid crystal layer disposed between the first substrate 100 and the second substrate.

A pixel array (not shown in FIG. 1) is also disposed on the first substrate 100 for displaying an image. An electric field is formed between the pixel array and the electrode array for driving the liquid crystal molecules to rotate.

It should be noted that, in order to distinguish the plurality of second leads 107 from the plurality of first leads 103 in FIG. 1, the plurality of second leads 107 are illustrated by dotted lines. A plurality of contact holes 104 are also illustrated in FIG. 1. In each of the plurality of electrode units 102, the first lead 103 and the second lead 107 are connected with the electrode unit 102 through a same contact hole 104, but the present disclosure is not limited thereto. In other embodiments, the first lead 103 and the second lead 107 can be connected with the electrode unit 102 through different contact holes.

It should be noted that, in this embodiment, each of the plurality of electrode units 102 is connected with one of the plurality of first leads 103 and one of the plurality of second leads 107. Each of the plurality of first leads 103 refers to a lead disposed between one electrode unit 102 and the touch display circuit 101, but the present disclosure is not limited thereto. In other embodiments, each of the plurality of first leads 103 may refer to more than one lead disposed between one electrode unit 102 and the touch display circuit 101, wherein the more than one lead provide (input) a same signal.

Similarly, in this embodiment, each of the plurality of second leads 107 refers to a lead disposed between one electrode unit 102 and the common lead 105, but the present disclosure is not limited thereto. In other embodiments, each of the plurality of second leads 107 may refer to more than one lead disposed between one electrode unit 102 and the common lead 105, wherein the more than one lead provide a same signal.

In this embodiment, a working period of the touch display panel includes a touch sensing period and a display period. In both the touch sensing period and the display period, a common signal is applied to the common lead 105.

During the display period, the touch display circuit 101 outputs a common signal. Each of the plurality of switches 106 turn on to electrically connect the common lead 105 and each of the plurality of second lead 107, so that the common signal can be applied to each of the plurality of electrode unit 102 through one first lead 103 and one second lead 107. A signal applied to the common lead 105 is the same as the common signal output by the touch display circuit 101, so that the first lead 103 and the second lead 107 form a parallel circuit between the electrode unit 102 and the touch display circuit 101. Therefore, an equivalent resistance between the electrode unit 102 and the touch display circuit 101 can be reduced, a common signal delay of the electrode unit 102 can be reduced, and a probability of occurrence of flicker, uneven display of black screen, or residual image can be reduced.

During the touch sensing period, the touch display circuit 101 output a touch signal. The switch 106 turns off to electrically disconnect the second lead 107 and the common lead 105. The touch signal is applied to the electrode unit 102 only through the first lead 103, and the common signal on the common lead 105 has no effect on the electrode unit 102. Therefore, touch sensing accuracy and sensitivity are improved.

It should be noted that, FIG. 1 only illustrates positions of the plurality of switches 106, and the specific structures and shapes of the plurality of switches 106 are not limited thereto.

Figure 2:
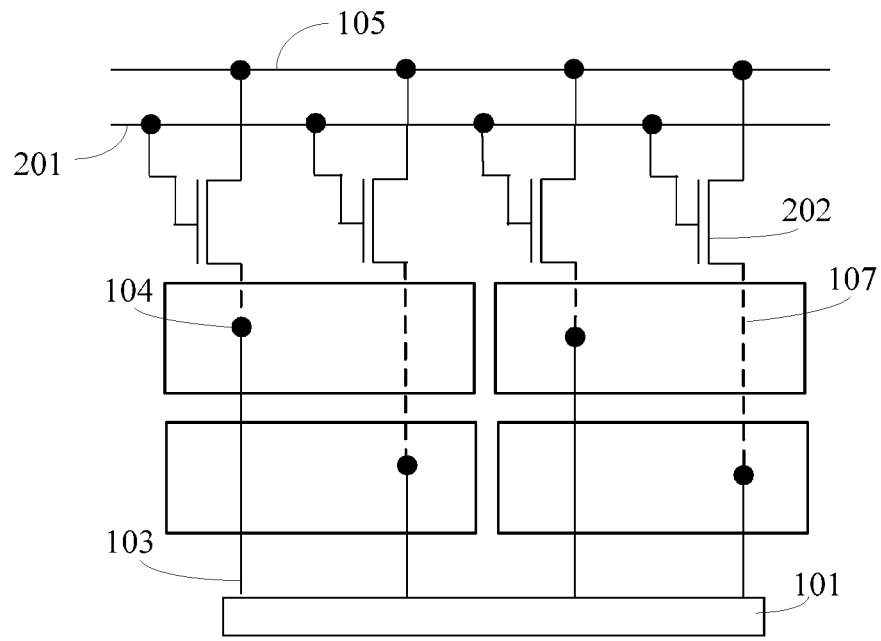
FIG. 2 schematically illustrates a diagram of switches in the touch display panel shown in FIG. 1 according to an embodiment of the present disclosure.

FIG. 2 illustrates a diagram of the plurality of switches 106 in the touch display panel according to one embodiment of the present disclosure. In order to describe a working principle of the plurality of switches 106 clearly, devices on the first substrate 100 and around the plurality of switches 106 are also illustrated, such as the plurality of electrode units 102, the plurality of first leads 103, the touch display circuit 101, etc.

Referring to FIG. 2, the touch display panel further includes a switch lead 201 which is adapted for turning on and turning off the plurality of switches.

Referring to FIGS. 1 and 2, each of the plurality of switches 106 includes a first thin film transistor 202. A source of the first thin film transistor 202 is electrically connected with the common lead 105, a drain of the first thin film transistor 202 is electrically connected with one of the plurality of second leads 107, and a gate of the first thin film transistor 202 is electrically connected with the switch lead 201.

In this embodiment, the first thin film transistor 202 is an N-type transistor. A first potential is applied on the switch lead 201 during the display period, so as to turn on the first thin film transistor 202. Namely, the switch 106 is turned on. During the touch sensing period, a second potential is applied on the switch lead 201, so as to turn off the first thin film transistor. Namely, the switch 106 is turned off. By using the first thin film transistor 202 as a switch, it is convenient to control the electric connection between the second lead 107 and the common lead 105.

However, the type of the first thin film transistor is not limited in the present disclosure. In other embodiments, the first thin film transistor may be a P-type transistor. During the display period, a low potential is applied on the switch lead 201, so as to turn on the first thin film transistor 202. During the touch sensing period, a high potential is applied on the switch lead 201, so as to turn off the first thin film transistor 202.

It should be noted that, in this embodiment, the switch lead 201 is electrically connected with the touch display circuit 101, and the touch display circuit 101 provides an electric signal on the switch lead 201. However, the present disclosure is not limited thereto. In other embodiments, the switch lead 201 may be connected with other leads of the touch display panel, so as to obtain an electric signal.

Figure 3:
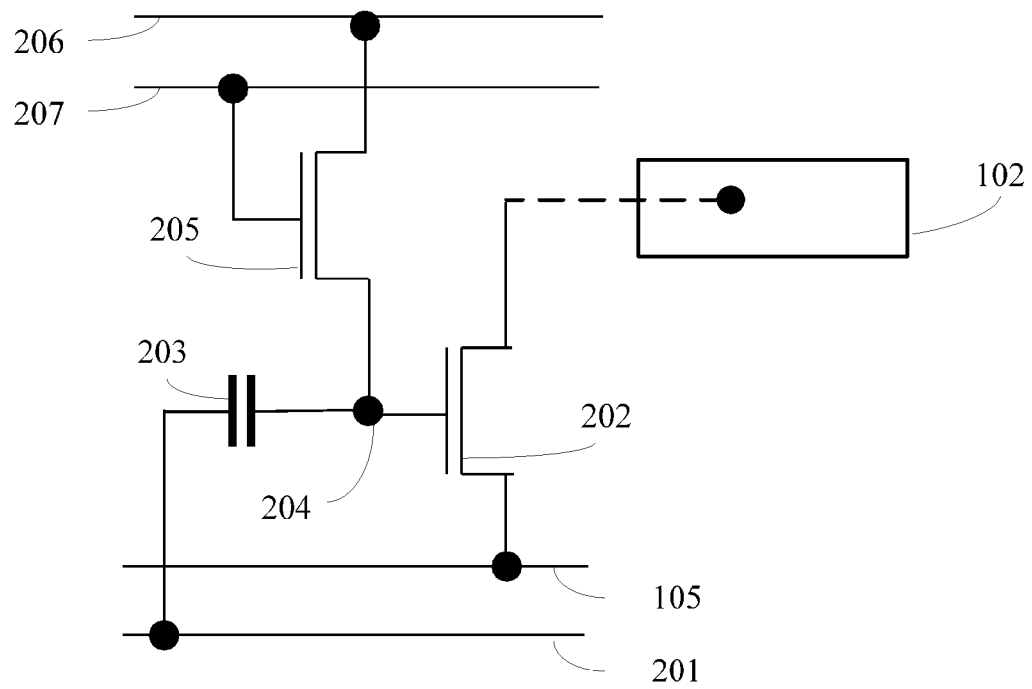
FIG. 3 schematically illustrate a diagram of switches in the touch display panel according to another embodiment of the present disclosure.

FIG. 3 illustrates a diagram of another switch in the touch display panel according to another embodiment of the present disclosure. This embodiment will be described in detail in conjunction with FIG. 3. In this embodiment, each of the plurality of switches is a thin film transistor 202. In order to describe a working principle of the plurality of switches clearly, devices on the first substrate 100 and around the switch 106 are also illustrated, such as the electrode unit 102, the common lead 105, the switch lead 107, etc. For simplicity, the same parts between this embodiment and the above embodiment will not be described in detail, but the different parts will be described hereunder.

Referring to FIG. 3, in this embodiment, a capacitor is disposed between the gate of the first thin film transistor 202 and the switch lead 201, a first node is disposed between the capacitor 203 and the first thin film transistor 202, and the first node 204 is adapted for charging the capacitor 203.

The touch display panel further includes a charging circuit which is electrically connected with the first node 204.

The charging circuit includes a second thin film transistor 205, wherein a source of the second thin film transistor 205 is adapted to input a first signal, and a gate of the second thin film transistor 205 is adapted to input a second signal. Specifically, as shown in FIG. 5, a first charging lead 206 and a second charging lead 207 is disposed on the first substrate (not shown), wherein the first signal is applied to the first charging lead 206, and the second signal is applied to the second charging lead 207.

A drain of the second thin film transistor 205 is electrically connected with the first node 204, and is adapted for charging the capacitor 203.

During the display period, first, the capacitor 203 is charged by the charging circuit. Then, after the capacitor 203 is charged, the first thin film transistor 202 is turn on by applying the second potential on the switch lead 105, so that the common signal is applied to the electrode unit 102 through the second lead 107. The first node 204 can obtain a higher potential by charging the capacitor 203, and then the gate of the first thin film transistor 202 can obtain a higher potential. Therefore, an equivalent resistance of the first thin film transistor 202 is reduced, an opening speed of the first thin film transistor 202 is improved, and an on-state current of first thin film transistor 202 is increased.

It should be noted that, in this embodiment, the first thin film transistor 202 is an N-type transistor, and the charging circuit is a booster circuit. During the display period, charging the capacitor 203 includes: raising the first signal and the second signal from a low potential to a high potential; turning on the second thin film transistor 202; and charging the capacitor 203.

In other embodiments, the first thin film transistor 202 may be a P-type transistor, and the charging circuit is a buck circuit. During the display period, charging the capacitor 203 includes: raising the first signal from a low potential to a high potential; reducing the second signal from a high potential to a low potential; turning on the second thin film transistor 202, and charging the capacitor 203.

Correspondingly, a driving method of a touch display panel is also provided in embodiments of the present disclosure. The driving method can be used to drive the touch display panel described above, but not limited thereto.

The driving method will be described in detail in conjunction with the accompanying drawings according to embodiments of the present disclosure. In one embodiment, the driving method is used to drive the touch display panel described above. The touch display panel is schematically illustrated in FIGS. 1-3.

Referring to FIG. 1, in this embodiment, the touch display panel includes: a first substrate 100; an electrode array disposed on the first substrate 100, wherein the electrode array includes a plurality of electrode units 102 which are arranged in array, and wherein the plurality of electrode units 102 serve as touch sensing electrodes during a touch sensing period, and serve as common electrodes during a display period; a touch display circuit 101, adapted for applying a touch signal to the plurality of electrode units 102 during the touch sensing period, and applying a common signal to the plurality of electrode units 102 during the display period; a plurality of first leads 103 adapted for transmitting the touch signal, wherein each of the plurality of electrode units 102 is electrically connected with the touch display circuit 101 through one of the plurality of first leads 103; a common lead 105 which is electrically connected with the touch display circuit 101 and adapted for transmitting the common signal; a plurality of second leads 107, wherein each of the plurality of electrode units 102 is electrically connected with the common lead 105 through one of the plurality of second leads 107; and a plurality of switches 106, wherein each of the plurality of switches 106 is disposed between one of the plurality of second leads 107 and the common lead 105.

It should be noted that, the touch display panel of this embodiment further includes a second substrate (not shown) disposed oppositely to the first substrate 100.

The first substrate 100 is an array substrate, and the second substrate is a color filter. The touch display panel further includes a liquid crystal layer disposed between the first substrate 100 and the second substrate.

A pixel array (not shown in FIG. 1) is also disposed on the first substrate 100 for displaying an image. An electric field is formed between the pixel array and the electrode array for driving the liquid crystal molecules to rotate.

It should be noted that, in order to distinguish the plurality of second leads 107 from the plurality of first leads 103 in FIG. 1, the plurality of second leads 107 are illustrated by dotted lines.

A working period of the touch display panel includes a touch sensing period and a display period. During the touch sensing period and the display period, a common signal is applied to the common lead 105.

During the display period, the touch display circuit 101 outputs a common signal. The plurality of switches 106 are turned on, so that the common signal is applied to each of the plurality of electrode units 102 through both one of the plurality of first leads 103 and one of the plurality of second leads 107. The plurality of switches 106 electrically connect common lead 105 and the plurality of second leads 107, so that the common signal is applied to each of the plurality of electrode units 102 simultaneously through both one of the plurality of first leads 103 and one of the plurality of second leads 107. A signal applied to the common lead 105 is the same as the common signal output by the touch display circuit 101, so that the first lead 103 and the second lead 107 form a parallel circuit between the electrode unit 102 and the touch display circuit 101. Therefore, an equivalent resistance between the electrode unit 102 and the touch display circuit 101 can be reduced, a common signal delay of the electrode unit 102 can be reduced, and a probability of occurrence of flicker, uneven display of black screen, or residual image can, in turn, also be reduced.

During the touch sensing period, the plurality of switches 106 are turned off, so that the touch signal is applied to the plurality of electrodes 102 through the plurality of first leads 105. The touch signal is applied to the electrode unit 102 only through the first lead 103, and the common signal on the common lead 105 has no effect on the electrode unit 102. Therefore, touch sensing accuracy and sensitivity are improved.

Referring to FIG. 1 and FIG. 2, the touch display panel further includes a switch lead 201. In this embodiment, each of the plurality of switches 106 includes a first thin film transistor 202. A source of the first thin film transistor 202 is electrically connected with the common lead 105, a drain of the first thin film transistor 202 is electrically connected with the second lead 107, and a gate of the first thin film transistor 202 is electrically connected with the switch lead 201. The switch lead 201 is electrically connected with each of the plurality of switches 106.

It should be noted that, in this embodiment, the switch lead 201 is electrically connected with the touch display circuit 101, and the touch display circuit 101 provides an electric signal on the switch lead 201. However, the present disclosure is not limited thereto. In other embodiments, the switch lead 201 may be connected with other leads of the touch display panel, so as to obtain an electric signal.

During the display period, a step of applying the common signal to the plurality of units 102 simultaneously includes applying a first potential on the switch lead 201, and applying the first potential to the gate through the switch lead 201, so as to turn on each of the plurality of switches, that is, turning on each of the plurality of switches 106.

During the touch sensing period, a step of applying the touch signal to the plurality of units 102 includes applying a second potential to switch lead 201, and applying the second potential to the gate through the switch lead, so as to turn off each of the plurality of switches, that is, turning off each of the plurality of switches 106.

Figure 4:
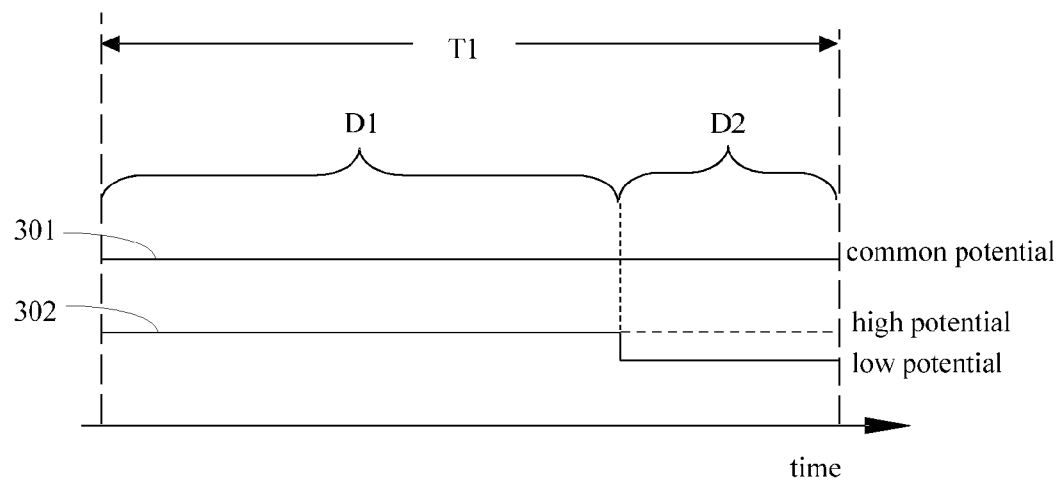
FIG. 4 schematically illustrate a timing diagram of potentials applied to a common lead and a switch lead in a method for driving a touch display panel according to an embodiment of the present disclosure.

A combination of an entire display period and an entire touch sensing period may be referred to a working period and/or cycle. FIG. 4 illustrates a diagram of potentials applied to the common lead and the switch lead of the touch display panel in a working period T1. Referring to FIG. 2 and FIG. 4, the working period T1 includes a display period D1 and a touch sensing period D2. A line 301 in FIG. 4 represents a variation of potential on the common lead 105 in a working period. A line 302 in FIG. 4 represents a variation of potential on the switch lead 201 in a working period.

As shown in FIG. 4, in this embodiment, the first thin film transistor 202 is an N-type transistor. During the display period D1, the first potential is a high potential, so as to turn on the first thin film transistor 202; and during the touch sensing period D2, the second potential is a low potential, so as to turn off the thin film transistor 202. In the entire working period T1, the common signal is always applied to the common lead in order to maintain the common potential.

However, levels of the first potential and the second potential are not limited in the present disclosure. In other embodiments, the first thin film transistor may be a P-type transistor. During the touch sensing period, the second potential is a high potential, so as to turn off the first thin film transistor; and during the display period, the first potential is a low potential, so as to turn on the first thin film transistor.

It should be noted that, in this embodiment, the common signal is always applied to the common lead 105 in an entire working period T1, so as to maintain the common potential. However, the present disclosure is not limited thereto. In other embodiments, during the touch sensing period, the common lead 105 may be floating, or applied with other electric signals in order to multiplex other functions. Because the plurality of switches 106 are turned off, the touch sensing function will not be affected.

The method of the present disclosure can be used to driving another touch display panel according to another embodiment. The method for driving the touch display panel may be described in detail in conjunction with FIG. 3.

In this embodiment, each of the plurality of switches includes a first thin film transistor 202. For simplicity, the same parts between this embodiment and the above embodiments will not be described in detail, but the different parts will be described hereunder.

Referring to FIG. 3, in this embodiment, a capacitor is disposed between the gate of the first thin film transistor 202 and the switch lead 201, a first node is disposed between the capacitor 203 and the first thin film transistor 202, and the first node 204 is adapted for charging the capacitor 203.

The touch display panel further includes a charging circuit which is electrically connected with the first node 204.

The charging circuit includes a second thin film transistor 205, wherein a source of the second thin film transistor 205 is adapted to provide (input) a first signal, and a gate of the second thin film transistor 205 is adapted to provide a second signal. Specifically, as shown in FIG. 3, a first charging lead 206 and a second charging lead 207 is disposed on the first substrate (not shown in FIG. 3), wherein the first signal is applied to the first charging lead 206, and the second signal is applied to the second charging lead 207.

A drain of the second thin film transistor 205 is electrically connected with the first node 204, and is adapted for charging the capacitor 203.

During the display period, a step of applying the common signal to the plurality of units simultaneously includes charging the capacitor 203 by the charging circuit; after the capacitor 203 is charged, applying a first potential on the switch lead 105 to turn on the first thin film transistor 202, so as to apply the common signal on the plurality of electrode units 102 through the plurality of second leads 107. The first node 204 can obtain a higher potential by charging the capacitor 203, and then the gate of the first thin film transistor 202 can obtain a higher potential. Therefore, an equivalent resistance of the first thin film transistor is reduced, an opening speed of the first thin film transistor 202 is improved, and an on-state current of first thin film transistor is increased.

It should be noted that, in this embodiment, the first thin film transistor 202 is an N-type transistor, and the charging circuit is a booster circuit. During the display period, charging the capacitor 203 includes raising the first signal and the second signal from a low potential to a high potential; turning on the second thin film transistor; and charging the capacitor 203.

In other embodiments, the first thin film transistor 202 may be a P-type transistor, and the charging circuit is a buck circuit. During the display period, charging the capacitor 203 includes raising the first signal from a low potential to a high potential; reducing the second signal from a high potential to a low potential; turning on the second thin film transistor; and charging the capacitor 203.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A touch display panel, comprising:
   a first substrate;
   an electrode array disposed on the first substrate, wherein the electrode array comprises a plurality of electrode units arranged in an array structure, and wherein the plurality of electrode units serve as touch sensing electrodes during a touch sensing period, and serve as common electrodes during a display period;
   a touch display circuit adapted for applying a touch signal to the plurality of electrode units during the touch sensing period, and applying a common signal to the plurality of electrode units during the display period;
   a plurality of first leads adapted for transmitting the touch signal, wherein each of the first leads is connected with the corresponding electrode unit through a contact hole, each of the plurality of electrode units is electrically connected with the touch display circuit through one of the plurality of first leads, and the first leads extend from the contact hole in a direction toward the touch display circuit;
   a common lead electrically connected with the touch display circuit and adapted for transmitting the common signal;
   a plurality of second leads, wherein each of the plurality of electrode units is electrically connected with the common lead through one of the plurality of second leads; and
   a plurality of switches, wherein each of the plurality of switches is disposed between one of the plurality of second leads and the common lead,
   wherein one end of each of the second leads is connected with the corresponding electrode unit via the contact hole, the other end of each of the second leads is connected with the common lead via the switch, and the second leads extend from the contact hole in a direction away from the touch display circuit.

2. The touch display panel according to claim 1, further comprising a switch lead adapted for turning on and turning off the plurality of switches.

3. The touch display panel according to claim 2, wherein each switch of the plurality of switches comprises a first thin film transistor, and wherein a source of the first thin film transistor is electrically connected with the common lead, a drain of the first thin film transistor is electrically connected with one of the plurality of second leads, and a gate of the first thin film transistor is electrically connected with the switch lead.

4. The touch display panel according to claim 3, wherein the first thin film transistor is an N-type transistor, and wherein the switch lead is adapted for providing a high potential to turn on the first thin film transistor during the display period, and providing a low potential to turn off the first thin film transistor during the touch sensing period.

5. The touch display panel according to claim 3, wherein the first thin film transistor is a P-type transistor, and wherein the switch lead is adapted for providing a low potential to turn on the first thin film transistor during the display period, and providing a high potential to turn off the first thin film transistor during the touch sensing period.

6. The touch display panel according to claim 3, wherein a capacitor is disposed between the gate of the first thin film transistor and the switch lead, a first node is disposed between the capacitor and the first thin film transistor, and the first node is adapted for charging the capacitor.

7. The touch display panel according to claim 6, further comprising a charging circuit electrically connected with the first node, wherein the charging circuit comprises a second thin film transistor, wherein a source of the second thin film transistor is adapted for inputting a first signal, a gate of the second thin film transistor is adapted for inputting a second signal, and a drain of the second thin film transistor is electrically connected with the first node for charging the capacitor.

8. The touch display panel according to claim 1, wherein the common lead and the touch display circuit are disposed on two opposite sides of the electrode array.

9. The touch display panel according to claim 8, wherein the switch lead is adjacent to the common lead.

10. A method for driving a touch display panel comprising a first substrate; an electrode array disposed on the first substrate, wherein the electrode array comprises a plurality of electrode units arranged in an array structure, and wherein the plurality of electrode units serve as touch sensing electrodes during a touch sensing period, and serve as common electrodes during a display period; a touch display circuit; a plurality of first leads, wherein each of the first leads is connected with the corresponding electrode unit through a contact hole, each of the plurality of electrode units is electrically connected with the touch display circuit through one of the plurality of first leads, and the first leads extend from the contact hole in a direction toward the touch display circuit; a common lead disposed on the first substrate; a plurality of second leads, wherein each of the plurality of electrode units is electrically connected with the common lead through one of the plurality of second leads; and a plurality of switches, wherein each of the plurality of switches is disposed between one of the plurality of second leads and the common lead, wherein one end of each of the second leads is connected with the corresponding electrode unit via the contact hole, the other end of each of the second leads is connected with the common lead via the switch, and the second leads extend from the contact hole in a direction away from the touch display circuit, the method comprising turning on the plurality of switches, and applying a common signal to the plurality of electrode units through both the plurality of first leads and the plurality of second leads; and turning off the plurality of switches, and applying a touch signal to the plurality of electrode units through the plurality of first leads.

11. The method according to claim 10, wherein the touch display panel further comprises a switch lead connected with each of the plurality of switches, wherein the turning on the plurality of switches and applying a common signal further comprises applying a first potential on the switch lead to turn on the plurality of switches, and wherein the turning off the plurality of switches, and applying a touch signal further comprises applying a second potential on the switch lead to turn off the plurality of switches.

12. The method according to claim 11, wherein each of the plurality of switches comprises a first thin film transistor, wherein a source of the first thin film transistor is electrically connected with the common lead, a drain of the first thin film transistor is electrically connected with one of the plurality of second leads, and a gate of the first thin film transistor is electrically connected with the switch lead, wherein the applying a first potential on the switch lead to turn on the plurality of switches further comprises applying a first potential to the gate through the switch lead to turn on each of the plurality of switches, and wherein the applying a second potential on the switch lead to turn off the plurality of switches further comprises applying a second potential to the gate through the switch lead to turn off each of the plurality of switches.

13. The method according to claim 12, wherein a capacitor is disposed between the gate of the first thin film transistor and the switch lead, a first node is disposed between the capacitor and the first thin film transistor, and the first node is connected with a charging circuit, and wherein applying a first potential to the gate through the switch lead further comprises:

charging the capacitor through the charging circuit to apply a first potential on the switch lead; and applying the first potential on the gate through the switch lead to turn off each of the plurality of switches.

14. The method according to claim 13, wherein the charging circuit comprises a second thin film transistor which is a N-type transistor, a first signal is input to a source of the second thin film transistor, a second signal is input to a gate of the second thin film transistor, and a drain of the second thin film transistor is electrically connected with the first node, and wherein the charging the capacitor through the charging circuit to apply a first potential on the first lead further comprises raising the first signal and the second signal from a low potential to a high potential to turn on the second thin film transistor for charging the capacitor.

15. The method according to claim 13, wherein the charging circuit comprises a second thin film transistor which is a P-type transistor, a first signal is input to a source of the second thin film transistor, a second signal is input to a gate of the second thin film transistor, and a drain of the second thin film transistor is electrically connected with the first node, and wherein the charging the capacitor through the charging circuit to apply a first potential on the first lead further comprises raising the first signal from a low potential to a high potential and reducing the second signal from a high potential to a low potential to turn on the second thin film transistor for charging the capacitor.

\* \* \* \* \*